United States Patent [19]

Propster et al.

[11] 4,316,732
[45] Feb. 23, 1982

[54] BYPASS WEDGE FOR DRYING AND PREHEATING GLASS BATCH AGGLOMERATES

[75] Inventors: Mark A. Propster, Gahanna; Charles M. Hohman, Granville, both of Ohio

[73] Assignee: Owens-Corning Fiberglas Corporation, Toledo, Ohio

[21] Appl. No.: 158,558

[22] Filed: Jun. 11, 1980

[51] Int. Cl.³ ............................................... C03B 1/00
[52] U.S. Cl. ......................................... 65/27; 65/135; 65/335
[58] Field of Search ........................... 65/27, 135, 335; 106/54, DIG. 8

[56] References Cited

U.S. PATENT DOCUMENTS 4,225,332  9/1980  Tsay ................................... 65/27 X

FOREIGN PATENT DOCUMENTS 658387  4/1979  U.S.S.R. ................................. 65/335

Primary Examiner—Arthur D. Kellogg
Attorney, Agent, or Firm—Ronald C. Hudgens; Patrick P. Pacella

[57] ABSTRACT

A process and apparatus for the manufacture of glass is disclosed. Glass batch agglomerates are formed, fed to a vertical bed preheat hopper, dried and preheated with furnace exhaust gases, and then fed to a glass melting furnace. A bypass wedge removes a portion of the exhaust gases below the top of the vertical bed to reduce superficial velocity and temperature of the gas through the top of the bed and reduce particulate emissions.

11 Claims, 4 Drawing Figures

BYPASS WEDGE FOR DRYING AND PREHEATING GLASS BATCH AGGLOMERATES

TECHNICAL FIELD

This invention relates to a process and apparatus for drying and preheating agglomerates which then are fed to a glass melting furnace.

BACKGROUND ART

Methods are known in the art for glass manufacturing wherein glass-forming, batch ingredients are compacted into agglomerates and then are dried and heated in a chamber by a direct contact with flue gases from a glass melting furnace so as to produce free-flowing agglomerates which are then conveyed and discharged to the glass melting furnace. These agglomerates are composite, integral, self-supporting masses consisting essentially of all the substantial batch materials and may take the form of balls, extrusions, discs, briquettes, and pellets. The agglomerates are discharged to a vertical bed contained within a chamber and furnace flue gases pass, in direct contact with and countercurrently to, downwardly moving pellets of the bed to preheat them.

One method known in the art to form the agglomerates is to combine the glass forming batch ingredients with water. In the context of drying and heating water-containing, glass batch agglomerates with flue gases from a fossil fuel fired melting furnace, the most desirable process equipment of the prior art is a shaft type heater, or chamber, i.e., a vertical bed of substantial height, and preferably a bed in which the agglomerates flow downwardly through the chamber and in which the flue gases flow countercurrent to the agglomerates, to substantially continuously, in a single processing operation, dry and preheat them.

This drying and preheating of agglomerates at times may generate high particulate emissions in the flue gases exhausting from the chamber. These emissions primarily are due to agglomerate spalling in the drying zone of the chamber or high superficial gas velocity through the chamber.

DISCLOSURE OF INVENTION

The bypass wedge of this invention will eliminate both these problems by providing a means for controlling and lowering the temperature of the flue gases in the drying zone of the chamber or hopper and also reducing superficial gas velocity (AFPM) downstream of the bypass wedge, i.e., near the top of the bed of agglomerates. This will directly reduce particulate emissions with no loss in present hopper performance, i.e., agglomerate preheat temperature and furnace gas scrubbing.

BEST MODE OF CARRYING OUT INVENTION

Generally, this invention is employed in a glass melting furnace from which molten glass issues. A shaft type preheater maintains a vertical bed of agglomerates, with the preheater preferably containing an upper substantially cylindrical portion and a lower inverted frustoconical portion. Hot exhaust gases are conveyed to a lower portion of the preheater and passed countercurrently to the gravitationally downwardly flow of the agglomerates therein so as to preheat the agglomerates to an elevated temperature. The heated agglomerates are discharged from the lower portion of the preheater and without significant cooling, are directly transmitted to a glass melting furnace.

Figure 1:
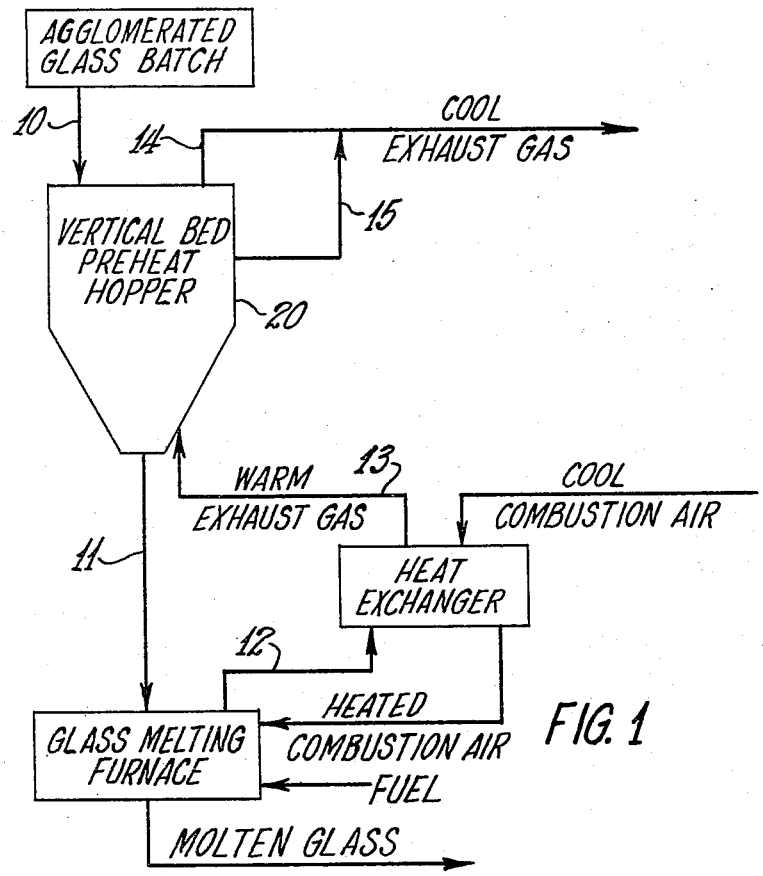
FIG. 1 is a flow diagram of the bypass wedge of this invention in connection with a conventional glass melting furnace and shaft type heater or hopper.

In FIG. 1, agglomerated glass batch 10 is continuously fed countercurrently to the flow of warm exhaust gas 13 in preheat hopper 20. Heated agglomerates 11 then are discharged to a glass melting furnace. Hot exhaust gas 12 from the glass melting furnace is passed through a heat exchanger prior to entering the preheat hopper. Cool exhaust gas 14 leaving the preheat hopper are vented to the atmosphere. This invention removes a portion of the gas below the top of the agglomerate bed as stream 15, which is vented to the atmosphere with cool exhaust gas 14. This bypass stream 15 reduces gas velocity and temperature at the bed exit and has the net result of emission reduction at the outlet of the bed by reducing agglomerate spalling and dust generation near the top of the bed.

Figure 2:
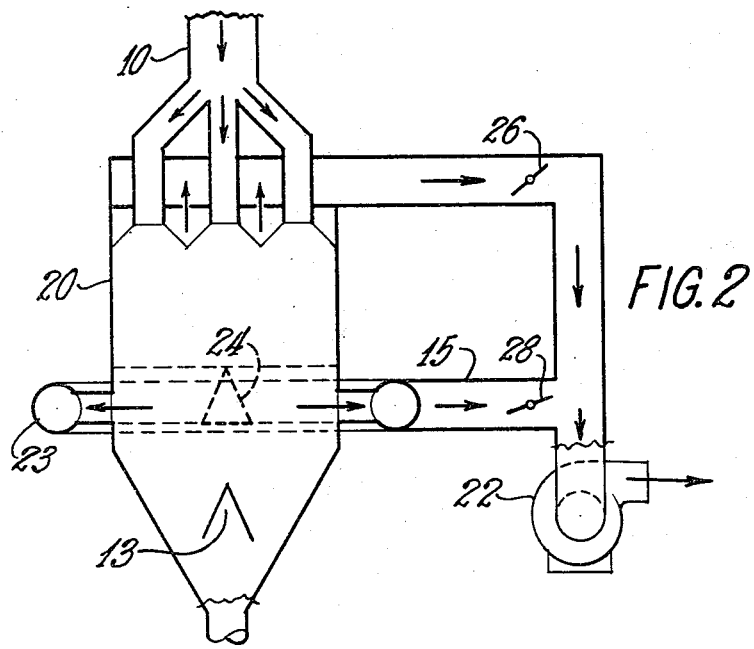
FIG. 2 illustrates the bypass wedge and preheat hopper of this invention in more detail.

In FIG. 2, the flow of agglomerates and exhaust gases through preheat hopper 20 is shown in greater detail. Blower 22 helps maintain the flow of gases through the system. The bypassed gases are withdrawn through a cross wedge 24 located in the pellet hopper and are collected into a bussel pipe 23 as stream 15. Stream 15 can be withdrawn anywhere between the inlet of warm exhaust gas 13 and prior to the pellet drying zone located near the top of the bed of agglomerates. Valves 26 and 28 are used to control flow rates through the hopper and bypass, respectively. Preferably, stream 15 is withdrawn low in the cylindrical section of the hopper. The distance between the two wedges must be sufficient to insure volatile collection.

Figure 3:
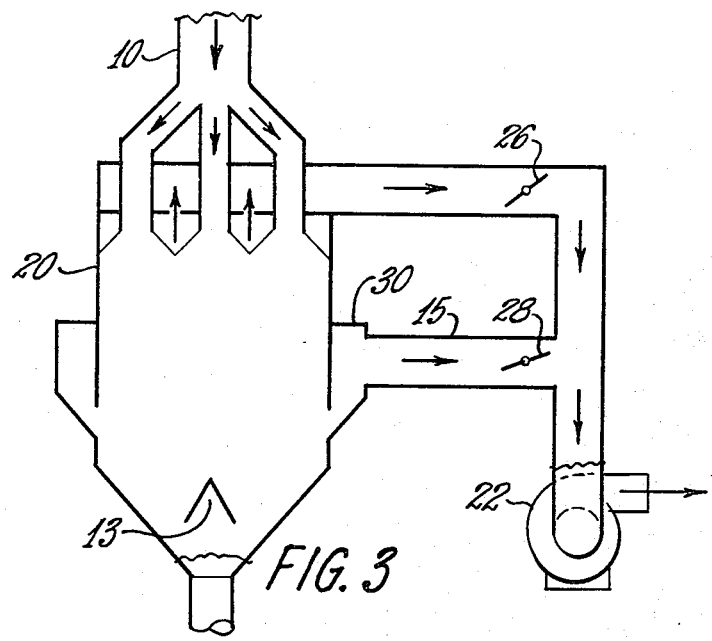
FIG. 3 illustrates an alternative embodiment to the bypass wedge of FIG. 2.

In FIG. 3, annular bypass gas flow sink 30 is shown, through which a portion of the hopper gases can be removed. The primary advantage of this scheme is that due to the cylindrical geometry of sink 30, a large area can be obtained by a small increase in the diameter of the annular region.

Figure 4:
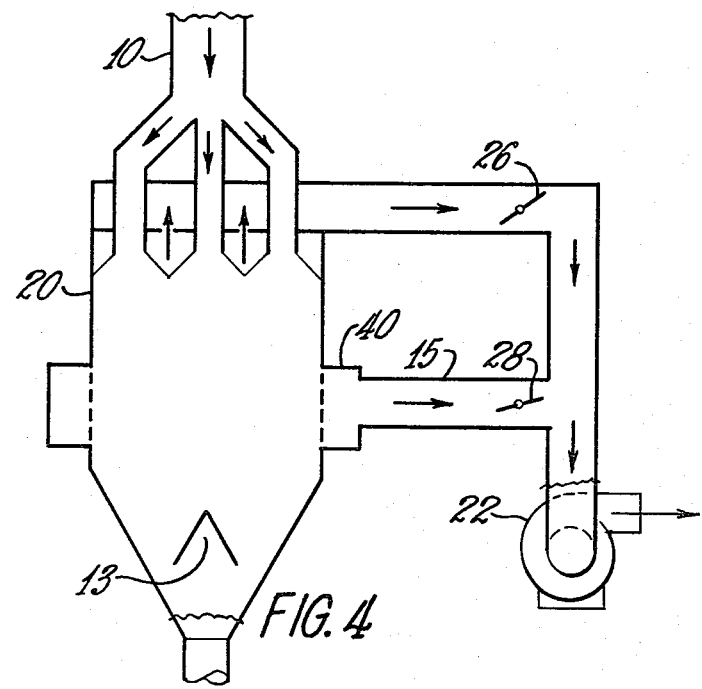
FIG. 4 illustrates an alternative embodiment to the bypass wedge of FIG. 2.

In FIG. 4, circumferal perforated hopper wall 40 is shown. Perforated wall 40 has a given area through which the bypass flow from the hopper can be withdrawn. This technique also can provide for sufficient bypass gas flow to reduce emissions from the pellet hopper.

Wet pellets spalling is a loss of pellet integrity during the drying process. This loss of integrity can be as complete as the explosion of a pellet to fine particulate or as subtle as the outer pellet shell fracturing or breaking off either of which result in an increase in the total particulate emission exhausting from the system. Spalling is caused by the inability of the green pellet to degas at the rate at which vapor is being generated within the pellet. Therefore, a pressure build-up occurs within the pellet which ultimately leads to its failure. The reduction of the gas temperature and velocity in the drying zone of the hopper through the use of the bypass wedge can eliminate this problem.

Current preheat hoppers have experienced emissions and the process of this invention provides a means for reducing these emissions. This invention reduces the pellet bed actual superficial gas velocity by withdrawing some of the hot gases below the top of the bed. This technique reduces gas velocity and reduces the gas temperature at the top of the bed. Both of which, result in the reduction or elimination of pellet spalling and dusting from the pellet surface.

EXAMPLE I

TABLE 1

| Percent Bypass (%) | Dimensionless Velocity At Bypass Wedge | Dimensionless Bypass Particulate Loading | Dimensionless Velocity At Hopper Exhaust | Dimensionless Hopper Exhaust Particulate Loading |
|---|---|---|---|---|
| 0 | 0 | 0 | 1.00 | 1.00 |
| 19.6 | 1.00 | 0.01 | 0.89 | 0.90 |
| 39.2 | 2.00 | 0.12 | 0.73 | 0.62 |

Table 1 presents the data in terms of dimensionless velocity and particulate loading normalized to the velocity and total particulate contained in the hopper exhaust with zero bypass flow.

An examination of the data in Table 1 indicates that particulate in the preheat hopper exhaust can be substantially reduced if sufficient cross sectional area for flow is provided by the bypass wedge to maintain the dimensionless velocity of 1.00. The impact of this invention on preheated, agglomerated batch is that it provides a means for controlling drying zone temperature and spalling and actual superficial velocity in order to reduce the total particulate emissions from the preheat system.

The environmental testing in Examples I and II were carried out in accordance with procedures and standards defined by the U.S.E.P.A. and published in the Federal Register, Volume 36, No. 247, dated Nov. 23, 1971, as amended and revised in the Federal Register, Volume 42, No. 160, dated Aug. 18, 1977, and specified as test methods 1 through 5.

EXAMPLE II

Environmental sampling for particulate loading composition, and boron and fluorine content of the gas simultaneously at two locations provided the most accurate information possible on the effectiveness of the bypass system set point over that particular time interval. Throughout the trials the system was allowed to come to equilibrium for at least 12 hours at a particular set point before the environmental sampling would begin. During this period of time, the pellet preheat temperature was unaffected by the bypass flow rate.

Example II presents the results obtained from two separate trials on the cross wedge system at various levels of bypassed flow. Table 2 describes the data pertaining to the dimensionless exhaust from the surface of the pellet bed as a function of the bypass level. Table 3 presents data pertaining to the exhaust removed from the pellet bed through the cross wedge bypass system expressed as a dimensionless superficial velocity through the projected cross wedge area as a function of the bypass level.

The dimensionless total particulate information in Tables 2 and 3 was obtained on two independent trials. However, the internal consistency of the results from the two data sets with respect to dimensionless velocity is superior. The concentration of boron and fluorine contained in the bypass exhaust is almost negligible. This dramatic difference indicates that the boron/fluorine from the furnace exhaust is essentially completely collected prior to the bypass wedge.

TABLE 2

| Date | % Bypass | Dimensionless Superficial Velocity At Pellet Surface | Dimensionless Total Particulate |
|---|---|---|---|
| A | 0 | 1.00 | 1.00 |
| B | 17 | 0.89 | 0.90 |
| C | 34 | 0.73 | 0.62 |
| D | 21 | 0.84 | 0.74 |
| E | 59 | 0.61 | 0.36 |

TABLE 3

| Run | % Bypass | Dimensionless Superficial Velocity At Pellet Surface | Dimensionless Total Particulate |
|---|---|---|---|
| A | 0 | — | — |
| B | 17 | 1.13 | 0.01 |
| C | 34 | 2.35 | 0.12 |
| D | 21 | 1.47 | 0.05 |
| E | 59 | 3.93 | 0.64 |
| F | 30 | 1.60 | 0.07 |

INDUSTRIAL APPLICABILITY

Agglomerating glass batch is produced in an agglomerator which is any conventional piece of equipment available in the art for combining glass forming batch ingredients and water into agglomerates. Typically, the amount of water in the agglomerates will range from 5 to 20 percent by weight. Preferably, the agglomerator will be a conventional rotary disk pelletizer. When manufacturing pellets, it is preferred to pass the pellets through a suitable sizing device such that the pellets to be further processed generally have a maximum dimension in the range of about ¼ to 1 inch and most desirably between ⅜ to about ⅝ inch. The agglomerated glass batch is typically at room temperature and is continuously fed countercurrently to the flow of exhaust gas in the preheat hopper.

In operation, combustion gas is introduced into the lower part of the preheat hopper. Agglomerated glass batch is introduced into the upper part of the preheat hopper. The flow of the gases and agglomerated batch countercurrent to each other. The dried and preheated agglomerates exit through the bottom of the preheat hopper and the cool gases exit through the top of the preheat hopper. A blower or fan may be employed to pull the exhaust gases from the preheat hopper or to maintain a negative pressure in the hopper. The pellets or agglomerates are heated to a temperature ranging from about 900° F. to 1250° F. by this exchange.

The agglomerated batch is continuously fed countercurrently to a flow of hot exhaust gas in the preheat hopper. The preheat hopper is an upright cylindrical chamber with a conical bottom having a pellet inlet and a gas outlet at the top and a pellet outlet and gas inlet at the bottom. The temperature of the gas at the inlet is about 1200° F. While in the preheat hopper, the pellets and hot exhaust gas are intimately contacted for a time sufficient to heat the agglomerates as described above. The agglomerates then are fed to a glass melting furnace.

A portion of the gases can be removed below the top of the pellet bed to reduce superficial velocity and temperature of the gases at the bed exit and result in total emission reduction in the hopper exhaust. The exhaust gases removed below the top of the bed are environmentally acceptable and can be combined with the exhaust gases removed from the top of the preheat hopper and vented to the atmosphere or a dust collector.

The pellet preheat temperature will remain unaffected provided the energy content of the exhaust gases after the portion is bypassed to reduce emission is greater than that required to preheat the pellets to the desired level. If this is not the case, a pellet hopper of sufficient diameter should be designed to take the necessary flow of exhaust gases to satisfy the pellet preheat heat balance and still maintain the superficial gas velocity at the exit to the pellet bed at the required level to obtain minimized particle generation. The bypass system can then be employed to fine tune the velocity and temperature conditions at the exit to the pellet bed.

We claim:

1. A process for producing glass by charging to a melting furnace and melting therein a batch including the steps of compacting the batch into agglomerates, forming a vertical bed with the agglomerates, moving the agglomerates in direct contact with and countercurrently to, hot furnace exhaust gases, removing exhaust gases that pass through the top part of the vertical bed and removing a portion of the exhaust gases below the top of the vertical agglomerate bed, wherein a sufficient amount of exhaust gases are removed below the top of the bed so that the exhaust gases passing through the top of the bed have a lowered temperature and a reduced velocity sufficient to reduce particulate emissions in the exhaust gases leaving the top of the bed.

2. A process for preparing glass by charging to a melting furnace and melting therein a batch comprising the steps of agglomerating the batch using a liquid, charging the wet agglomerates onto the upper surface of a vertical bed preheat hopper having a lower discharge end communicating with the furnace, substantially simultaneously (1) withdrawing agglomerates through said lower discharge end for charging to the furnace, (2) moving the remaining agglomerates by gravity downwardly through the bed, (3) passing the hot furnace exhaust gas upwardly through the bed to heat the agglomerates therein, (4) drying the wet agglomerates on the upper surface of the bed with exhaust gas which has already passed through the bed, (5) removing the exhaust gases that pass through the top of the agglomerate bed, and (6) removing a portion of the exhaust gases below the top of the agglomerate bed, wherein a sufficient amount of exhaust gases are removed below the top of the bed so that the exhaust gases passing through the top of the bed have a lowered temperature and a reduced velocity sufficient to reduce particulate emissions in the exhaust gases leaving the top of the bed.

3. A process of producing glass from a batch material for forming a glass in a furnace which liberates hot effluent gases including solid contaminant particles, comprising the steps of:
pelletizing the batch materials using a liquid,
charging the wet pellets to the charging end of a vertical bed preheat hopper having charging and discharging ends,
maintaining a layer of wet pellets at the charging end of the hopper,
conducting the hot furnace effluent gases through the bed and through the layer of wet pellets,
removing the effluent gases that pass through the layer of wet pellets, and removing a portion of the effluent gases below the layer of wet pellets, wherein a sufficient amount of gases are removed below the layer of wet pellets so that the gases passing through the layer of wet pellets have a lowered temperature and a reduced velocity sufficient to reduce particulate emissions in the gases leaving the top of the layer of wet pellets.

4. An apparatus for producing molten glass comprising:
means for forming glass batch into agglomerates;
a free flowing, shaft-type vertical bed preheat hopper;
means for supplying the agglomerates to the upper portion of the hopper;
a glass melting furnace;
means for supplying the agglomerates from the lower portion of the hopper to the glass melting furnace;
means for supplying exhaust gases to the lower portion of the preheat hopper;
means for removing the exhaust gases that pass through the top part of the hopper; and
bypass means for removing a portion of the exhaust gases below the top of the hopper,
wherein the bypass means is located above the means for supplying exhaust gases to the hopper so as to heat the agglomerates in the lower portion of the hopper.

5. An apparatus according to claim 4 wherein the bypass means is a single gas outlet wedge extending through the hopper.

6. An apparatus according to claim 4 wherein the bypass is a plurality of gas outlet wedges extending through the hopper.

7. An apparatus according to claim 4 wherein the bypass is a pair of crossed gas outlet wedges extending through the hopper.

8. An apparatus according to claim 5 or 7 wherein the hopper has a cylindrical section and the bypass is located low in the cylindrical section of the hopper.

9. An apparatus according to claim 7 wherein the pair of cross wedges is connected to a bussel pipe extending around the hopper.

10. An apparatus according to claim 4 wherein the bypass means is an annular bypass gas flow sink extending around the hopper.

11. An apparatus according to claim 4 wherein the bypass means is a circumferential perforated wall extending around the hopper.

* * * * *